United States Patent
Strulo et al.

(10) Patent No.: US 8,625,426 B2
(45) Date of Patent: Jan. 7, 2014

(54) NETWORK FLOW TERMINATION

(75) Inventors: Ben Strulo, Felixstowe (GB); Marc Wennink, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 291 days.

(21) Appl. No.: 13/262,474

(22) PCT Filed: Mar. 25, 2010

(86) PCT No.: PCT/GB2010/000571
§ 371 (c)(1),
(2), (4) Date: Sep. 30, 2011

(87) PCT Pub. No.: WO2010/112818
PCT Pub. Date: Oct. 7, 2010

(65) Prior Publication Data

US 2012/0033553 A1 Feb. 9, 2012

(30) Foreign Application Priority Data

Mar. 31, 2009 (EP) .................................. 09251007

(51) Int. Cl.
*H04L 12/26* (2006.01)
*G06F 15/16* (2006.01)

(52) U.S. Cl.
USPC ........... 370/232; 370/248; 370/252; 709/229; 709/234

(58) Field of Classification Search
USPC ................ 370/216–218, 221–222, 230–236, 370/237–238.1, 248–253, 254–258; 709/220–221, 225–226, 229–235, 709/238–241
See application file for complete search history.

(56) References Cited

U.S. PATENT DOCUMENTS 6,414,939 B1 * 7/2002 Yamato ..................... 370/236.1
7,286,552 B1 * 10/2007 Gupta et al. .................. 370/413

(Continued)

FOREIGN PATENT DOCUMENTS

EP          1 936 880      6/2008
WO        2008/145178    12/2008

OTHER PUBLICATIONS

Feng et al, "Impact of ATM ABR control on the performance of TCP-Tahoe and TCP-Reno"; Global Telecommunications Conference, 1997. GLOBECOM '97, IEEE. Publication Year: 1997, pp. 1832-1837, vol. 3.*

(Continued)

*Primary Examiner* — Thai Hoang
(74) *Attorney, Agent, or Firm* — Nixon & Vanderhye P.C.

(57) ABSTRACT

A network has a plurality of edge nodes (7a, 7b, 7c, 7d) and core nodes (3a, 3b, 3c) for carrying flows of data from an ingress gateway (7a, 7b, 7c, 7d) to an egress gateway (7a, 7b, 7c, 7d) along a path of core nodes. For any given path in the network work from an ingress node to an egress node, the number of flows is controlled. When network congestion occurs, the egress gateway (7a, 7b, 7c, 7d) provides an indication of the level of network congestion. Terminating flows is disruptive and therefore the ingress gateway (7a, 7b, 7c, 7d) can mark other flows with a congestion marker and send them to the egress gateway (7a, 7b, 7c, 7d). These marked flows are routed by the core and egress gateway (7a, 7b, 7c, 7d) but ignored for calculating network congestion. When the network congestion is alleviated, the marked flows can be un-marked and treated as normal flows, hence the network avoids unnecessary flow termination.

10 Claims, 5 Drawing Sheets

(56) References Cited

U.S. PATENT DOCUMENTS

| | | | |
|---|---|---|---|
| 7,830,801 B2 * | 11/2010 | Kwan et al. | 370/235 |
| 7,907,519 B2 * | 3/2011 | Songhurst et al. | 370/229 |
| 8,274,974 B1 * | 9/2012 | Gupta et al. | 370/389 |
| 8,315,168 B2 * | 11/2012 | Davari | 370/235 |
| 8,509,085 B2 * | 8/2013 | Bader et al. | 370/236 |
| 2003/0112756 A1 | 6/2003 | Le Gouriellec et al. | |
| 2004/0037223 A1 * | 2/2004 | Harrison et al. | 370/235 |
| 2005/0025158 A1 | 2/2005 | Ishikawa et al. | |
| 2007/0237074 A1 * | 10/2007 | Curry | 370/229 |
| 2007/0268827 A1 | 11/2007 | Csaszar et al. | |
| 2007/0291643 A1 | 12/2007 | Charny et al. | |
| 2008/0130502 A1 | 6/2008 | Charny et al. | |
| 2009/0003212 A1 * | 1/2009 | Kwan et al. | 370/235 |
| 2009/0003354 A1 * | 1/2009 | Sreejith et al. | 370/396 |
| 2010/0054126 A1 * | 3/2010 | Kwan et al. | 370/235 |
| 2010/0208591 A1 * | 8/2010 | Corliano et al. | 370/237 |

OTHER PUBLICATIONS

Li et al; "SMAQ: a measurement-based tool for traffic modeling and queuing analysis. I. Design methodologies and software architecture"; vol. 36, Issue: 8; Publication Year: 1998, pp. 56-65.*

International Search Report for PCT/GB2010/000571, mailed May 12, 2010.

Menth, M. et al., "Threshold configuration and routing optimization for PCN-based resilient admission control", Comuter Networks, (Feb. 13, 2009), pp. 1-13.

Menth University of Wuerzburg et al., "PCN Encoding for Packet-Specific Dual Marking (PSDM); draft-menth-pcn-psdm-encoding-00.txt", Internet Engineering Task Force; Internet Society, (Jul. 7, 2008).

Menth University of Wuerzburg et al., "Deployment Models for PCN-Based Admission Control and Flow Termination Using Packet-Specific Dual Marking (PSDM); draft-menth-pcn-psdm-deployment-00.txt", Internet Engineering Task Force; Internet Society, (Oct. 24, 2008).

Eardly, P., "Pre-Congestion Notification (PCN) Architecture; draft-ietf-pcn-architecture-10.txt", vol. pcn, No. 10; Internet Engineering Taskforce; Internet Society, (Mar. 16, 2009).

Charny Cisco Systems A et al., "Pre-Congestion Notification Using Single Marking for Admission and Termination; draft-charny-pcn-single-marking-03.txt", Internet Engineering Task Force, No. 3, (Nov. 18, 2007).

Menth, Michael and Hartmann, Matthias, "Threshold configuration and routing optimization for PCN-based resilient admission control", Univerity of Wuerzburg, Institute of Computer Science, Germany, Computer Networks 53 (2009) 1771-1783, available online Feb. 13, 2009 (14 pgs.).

Menth, M. et al., PCN Encoding for Packet-Specific Dual Marking (PSDM), Jun. 26, 2009, (10 pgs.).

Menth, M. et al., "Deployment Models for PCN-Based Admission Control and Flow Termination Using Packet-Specific Dual Marking (PSDM)", Oct. 24, 2008, (20 pgs.).

Eardley, Philip, "Pre-Congestion Notification (PCN) Architecture", Mar. 16, 2009, (62 pgs.).

Charny, A., "Pre-Congestion Notification Using Single Marking for Admission and Termination", Nov. 18, 2007, (60 pgs.).

Moncaster, T., "Baseline Encoding and Transport of Pre-Congestion Information", Oct. 14, 2008, (12 pgs.).

* cited by examiner

NETWORK FLOW TERMINATION

This application is the U.S. national phase of International Application No. PCT/GB2010/000571, filed 25 Mar. 2010, which designated the U.S. and claims priority to EP Application No. 09251007.2, filed 31 Mar. 2009, the entire contents of each of which are hereby incorporated by reference.

The present invention relates to data packet networks and in particular to a method of terminating flows of data packets during periods of network congestion.

INTRODUCTION

Internet protocol networks are handling increasing volumes of data, with the data being of different types. For example, potential high value Internet services, such as voice and video, generate mostly constant bit-rate, inelastic traffic which is difficult to adapt to a change in network environment. Such traffic competes for bandwidth with data transfers, such as email and the like, which are much more reactive to changing network conditions. When congestion occurs, all traffic to a congested node is affected, meaning that packets can then be lost at the node. The consequences of packet loss for a particular data stream can vary, depending on the type of the stream. For voice-over-IP (VoIP), telephony, and video applications, packet losses manifest themselves as artefacts in the received audio or video, such as the audio breaking up, or videos having the image freeze.

It is known to control admission of new data flows (a sequence of related data packets from a data sender to a data receiver via the network, e.g. a VoIP telephone conversation or a video stream) into a network, so as to only admit new data flows if the network has sufficient capacity in addition to the data packets of previously admitted data flows. This is known as admission control. In this field, recently measurement-based admission control (MBAC) has been of interest. One particular MBAC solution is known as pre-congestion notification (PCN) which has been developed by the Congestion and Pre-congestion Notification working group of the Internet Engineering Taskforce. A description of the present status of PCN can be found at http://tools.ietf.org/html/draft-ietf-pcn-architecture-03.

In a case where serious network disruption occurs, such as link failures within the hardware of the network or extreme data loads, simply blocking new flow requests is not sufficient to maintain the Quality of Service (QoS) of existing flows on the network. In such a case, in addition to performing admission control existing admitted flows must be terminated to restore the level of congestion in the network to an acceptable state. This process is known as a flow termination mechanism.

To implement flow termination, the PCN specification defines a packet marking scheme whereby a field in the header of a PCN data packet forming part of an admitted flow can be altered by PCN network nodes in response to detected congestion. In this marking scheme, packets are either "Not Marked" (NM) or carry the congestion marker "To Terminate" (TT).

Each link in the PCN network (outgoing paths from a node) monitors the number of NM packets that flow along it and compares the rate of NM packets against a predetermined sustainable rate value for that link. The sustainable rate is the rate of PCN traffic that the link can support without needing to terminate any flows in order to maintain a level of QoS. The difference is used to identify how many flows may need to be terminated when congestion is detected. Each link calculates the difference between the rate of NM packets and the sustainable rate, and uses this difference value to mark a sufficient number of packets from NM to TT so that the rate at which NM packets leave the link is equal to or less than the sustainable rate on the link.

Terminating flows to maintain the sustainable rate in response changing network conditions leads to a loss of service for some of the users or processes owning the flows until the network conditions become more favourable. Therefore it is important that a minimal number of flows that are terminated to minimize disruption.

The present invention addresses the above problem. In particular the present invention changes both the marking and the termination behaviour to improve the accuracy and speed of flow termination.

In one aspect the present invention provides a method as set out in claim 1.

In another aspect the present invention provides a network edge node configured as an ingress gateway as set out in claim 5.

In a further aspect, the present invention provides a network as set out in claim 9.

FIGURES

Features of the present embodiment will now be described with reference to the following figures in which.

FIRST EMBODIMENT

Figure 1:
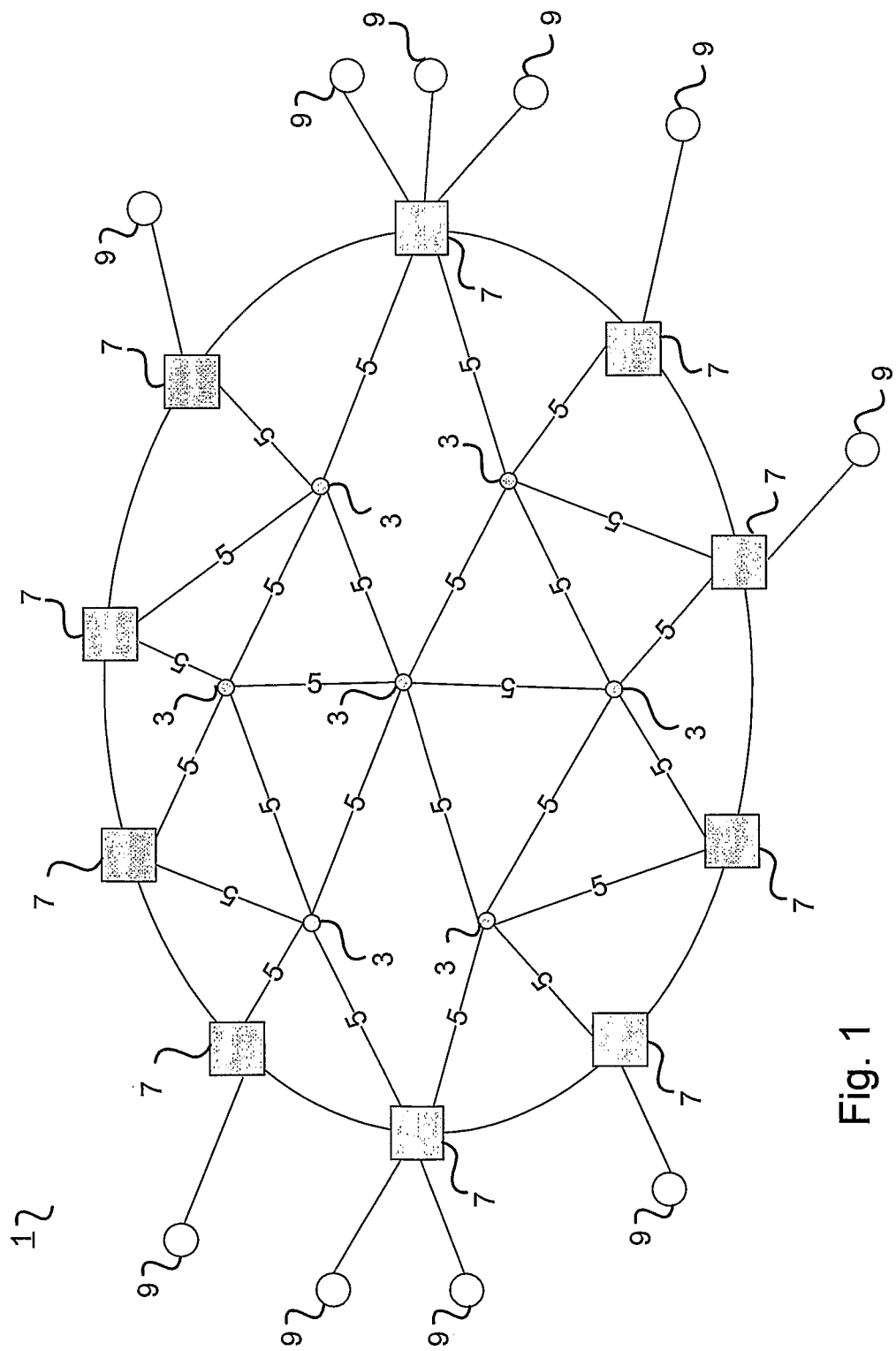
FIG. 1 shows an overview of a PCN network.

FIG. 1 shows an overview of the network topology to which the flow control system can be applied. A network 1 is formed of nodes 3, 7 connected by lines 5. In the network, there are core nodes 3 and edge nodes 7. Core nodes are only connected to other core nodes 3 and edge nodes 7 whilst edge nodes 7 define the edge of the network 1 and therefore are connected to core nodes 7 and also external entities such as customers 9.

Customers 9 communicate with each other via the network 1. They are connected to the edge nodes 7 and therefore the edge nodes 7 act as Ingress Gateways when receiving data from a customer and as Egress Gateways when sending data from the core to the customer. The flow of data from customer to customer is therefore:

Customer→Ingress Gateway→One of more Core Nodes→Egress Gateway→Customer.

A continuous series of packets issued from a first customer to another customer and transported across the network 1 will be referred to as a flow for, the rest of the description. An example of a flow would be a telephone conversation.

Figure 2:
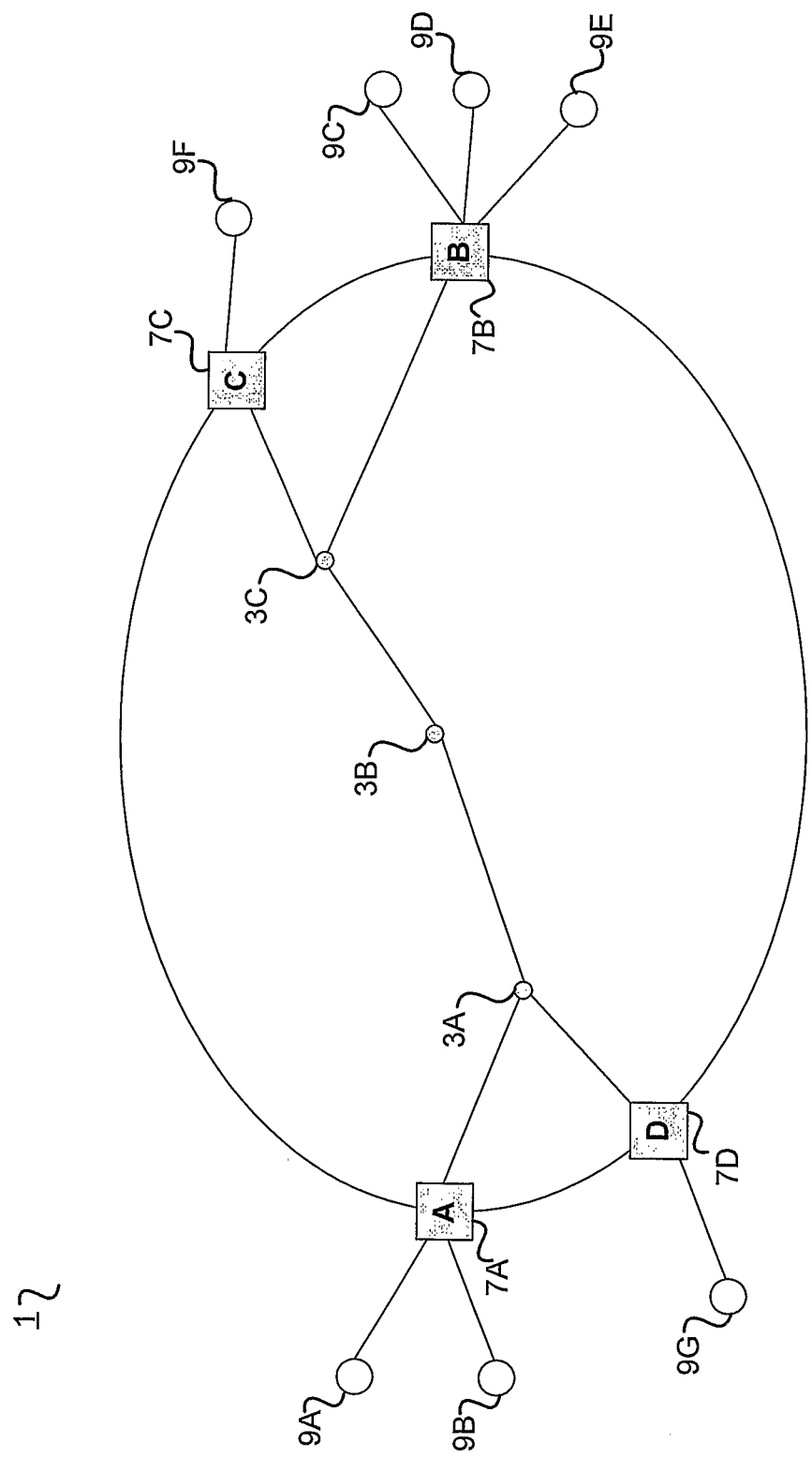
FIG. 2 shows a simplified view of the PCN network.

For ease of explanation, the operation of the network will be described in relation to a subset of the nodes shown in FIG. 1. FIG. 2 shows a simplified view of the network shown in FIG. 1 to explain how packets flow across the network.

FIG. 2 shows only four of the edge nodes 7A-7D, three core nodes 3A-3C and customers 9A-9G.

When packets flow from edge node 7A to edge node 7B then node 7A is the ingress node and node 7B is the egress node. Conversely, when packets flow from node 7B to node 7A then node 7B is the ingress node and node 7A is the egress node. It will be clear to the skilled person that an edge node can function simultaneously as an ingress gateway and an egress gateway depending on whether data is entering or leaving the network.

Although the flow of packets could traverse the network via any combination of core nodes from an ingress node to an egress node, in this network, set paths are defined for packet flow along predetermined routes. For example, flows entering the network from ingress gateway 7A and leaving the network at egress gateway 7B will only traverse the network via core nodes 3A→3B→3C even though other paths are possible. The Open Shortest Path First (OSPF) dynamic routing protocol may be used to converge the network and define these paths. A summary of the paths is shown below.

| Path ID | Ingress | Egress | Intermediate core nodes |
| --- | --- | --- | --- |
| 1 | 7A | 7B | 3A → 3B → 3C |
| 2 | 7A | 7C | 3A → 3B → 3C |
| 3 | 7A | 7D | 3A |
| 4 | 7B | 7A | 3C → 3B → 3A |
| 5 | 7B | 7C | 3C |
| 6 | 7B | 7D | 3C → 3B → 3A |
| 7 | 7C | 7A | 3C → 3B → 3A |
| 8 | 7C | 7B | 3C |
| 9 | 7C | 7D | 3C → 3B → 3A |
| 10 | 7D | 7A | 3A |
| 11 | 7D | 7B | 3A → 3B → 3C |
| 12 | 7D | 7C | 3A → 3B → 3C |

Of course, these paths do not exist as discrete separate lines in the network but are logical paths defined by the routing tables of the core nodes 3.

As an example of the operation of the network, consider the situation of a customer 9A sending data to customer 9D and customer 9G sending data to customer 9F across the network.

From a network wide perspective as defined in the above table, the data packets forming the flow from customer 9A to 9D travel along path 1 and the data packets forming the flow from customer 9G to 9F travel along path 12.

Each node does not store the complete routing table shown above, but contains enough local knowledge of the surrounding network to determine which output port the packets should be sent to on their onward journey.

When node 7A acting as an ingress gateway, receives data packets from customer 9A addressed to customer 9D, it consults its routing table and determines that the data should be forwarded to core node 3A. All subsequent data packets in that flow are sent on the same path.

Similarly when ingress node 7D receives data packets from customer 9G addressed to customer 9F then, based on its routing table, the data packet is sent to core node 3A and all subsequent data packets in the flow are sent along that path.

Core node 3A has an input port for traffic from edge node 7A and a different input port for traffic received from edge node 7D. In this case, the routing table tells the packets to be sent out on the same output port to core node 3B.

Core node 3B receives the path 1 and path 12 data packets on the same inbound port and after consulting its routing table sends them out on the same outbound port to core node 3C.

At core node 3C, the path 1 and path 12 traffic arrives on the same input port. The core node consults its routing table and determines that path 1 data is to be forwarded on an outbound port towards egress gateway 7B and that path 12 traffic is to be forwarded on an outbound port towards egress gateway 7C.

As shown above, traffic within the core of the network flows in paths from ingress gateways to egress gateways. The paths may overlap and share the same physical links within the core but the nodes can examine the contents or headers of the packets to ensure correct delivery.

Under normal circumstances the flows last as long as the customer desires. As mentioned earlier, when light congestion is experienced, then the ingress gateways are arranged to respond by preventing new flows from being admitted into the network. However, in the event of a serious failure in the network it is possible that some flows will need to be terminated. Such action is clearly undesirable but sacrificing some flows may be necessary in order to maintain the overall smooth operation of the network.

The operation of each different type of node during network congestion will now be described. The edge nodes (ingress and egress) and core nodes act asynchronously according to a local schedule.

Core Nodes

Figure 3:
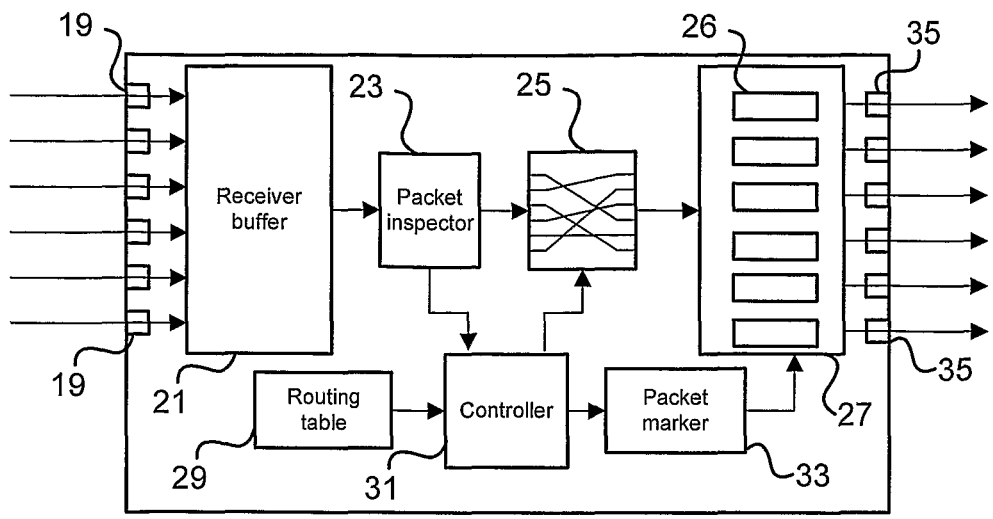
FIG. 3 shows the components of a core node illustrated in FIG. 1.

FIG. 3 shows the internal structure of a core node. Incoming packets are received via input ports 19. Each input port being connected to a different node in the network. Since packets may arrive simultaneously, the packets are temporarily stored in a FIFO receiver buffer 21. A packet inspector 23 takes packets from the receiver buffer 21 and examines the headers to determine the destination address of the packet. A controller 31 receives the extracted destination address and performs a lookup into a routing table 29 to determine the next node on the path to the destination. The controller then controls switch 25 to place the packets into an appropriate queue 26 inside a send buffer 27. The packets are then processed by packet marker 33 before being sent towards their destination via output ports 35 connected to different nodes in the network.

The core nodes 3 are designed to move packets across the network 1 as quickly as possible. Therefore the amount of processing carried out by each core node 3 on the incoming packets between the input ports 19 and the output ports 33 must be kept to a minimum. In this embodiment, the core nodes 3 do not have any awareness of flows, only incoming data packets. They merely process traffic (the plurality of packets) using simple algorithms.

The routing behaviour of the node is conventional and will not be described in more detail. However, the process of the packet marker 33 in deciding whether or not to mark packets will now be described with reference to FIG. 4.

The packet marker 23 is arranged to recognise three possible packet markings located in the header of each packet:

Not Marked—'NM';
To Terminate—'TT'; and
Ready to Terminate—'RT'.

The packet marker 33 monitors the queue 26 relating to each output port 35 of the core node 3, and for each queue processes the packets according to each detected packet marking. In particular, the packet marker 33 continuously monitors the rate at which NM packets leave the output ports of the node. This monitoring is implemented using a token bucket. The token bucket has a predetermined token fill rate which is pre-set to be just below the line rate of the output port. This is known as the supportable rate and provides the packet marker 33 with a warning that the node may be close to dropping packets. As NM packets arrive, tokens are removed from the token bucket in proportion to their packet size.

If there are sufficient tokens then the NM packets are sent without change. If the token bucket has insufficient tokens, the packet marker 33 starts marking subsequently received NM packets with a TT marking in the header field until the bucket has refilled with sufficient tokens. This indicates to later nodes that the output link of the core node is close to saturation and flows may need to be terminated.

The packet marker 33 only monitors the flow of NM packets and ignores packets marked with RT headers or packets marked with TT headers, hereinafter referred to as RT packets and TT packets respectively.

Figure 4:
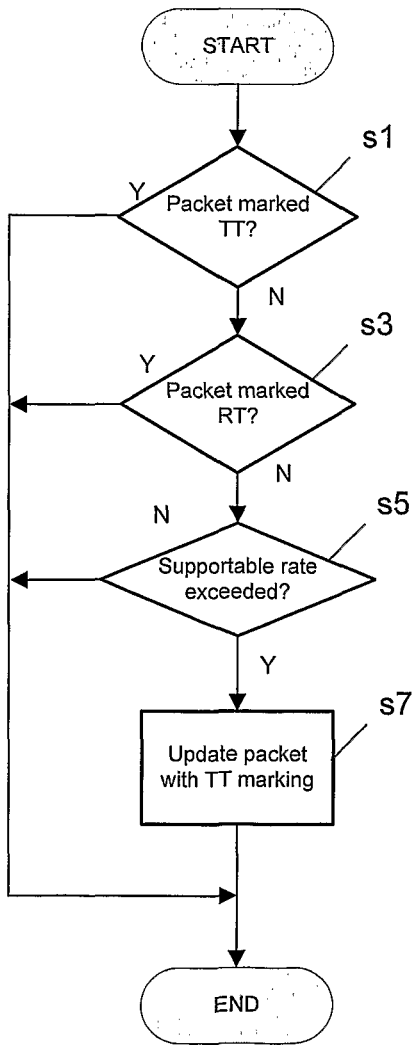
FIG. 4 is a flow chart showing the operation of a packet marker of a core node illustrated in FIG. 3.

FIG. 4 is a flowchart showing the operation of the packet marker 33 on each packet. At step s1 the packet is examined to determine if it is a TT packet, i.e. it contains the marking TT in its header. If so, then processing ends and the packet is sent. If the packet is not a TT packet, in step s3 the packet marker 33 determines if the packet is an RT packet. If it is then processing ends and the packet is sent.

If the packet is an NM packet, then in step s5 the packet marker 33 checks whether the supportable rate has been exceeded. If it has not then processing ends, however, if the supportable rate has been exceeded then in step s7 the NM packet is marked with a TT marker to become a TT packet and processing ends.

Referring to the example configuration shown in FIG. 2, core node 3A receives NM packets from ingress gateways 7A and 7D addressed to different customers on different input lines, but due to the arrangement of the predetermined paths, those NM packets are directed to the same queue for the output line towards node 3B. The packet marker of node 3A meters the NM packet traffic and if the combined volume of NM traffic is less than the supportable rate then the packets are sent without change. However, if the number of packets from either or both ingress gateways 7A, 7B increases such that the supportable rate is exceeded (i.e. the token bucket runs out of tokens), then the packet marker 33 responds by marking subsequently received NM packets with the TT mark until the bucket refills. The TT packets can still be forwarded to node 3B because the line rate of output port is higher than the supportable rate.

When the TT marked packets reach node 3B, the packet marker of node 3B does not include the TT packets in its metering calculation, the TT packets are sent towards the destination node without requiring a tokens. In this example, since the supportable rate of the core nodes are the same, node 3B will not need to mark any further NM packets as TT packets because node 3A has already ensured that the rate of NM packets arriving at node 3B from node 3A is below the supportable rate.

However, if packets from another node (not shown) arrived at node 3B and were routed to node 3C then further packets may be marked TT.

The packets continue travelling between the core nodes until they reach their destination egress node. Note that packets can only be changed from NM to TT within the core. Packets cannot be "unmarked" from TT to NM within the core of the network.

Egress Gateways

As mentioned above, the core nodes identify when the packet flow on each of their output lines is higher than the predetermined supportable rate and if this threshold is exceeded, NM packets are marked as TT packets.

Figure 5:
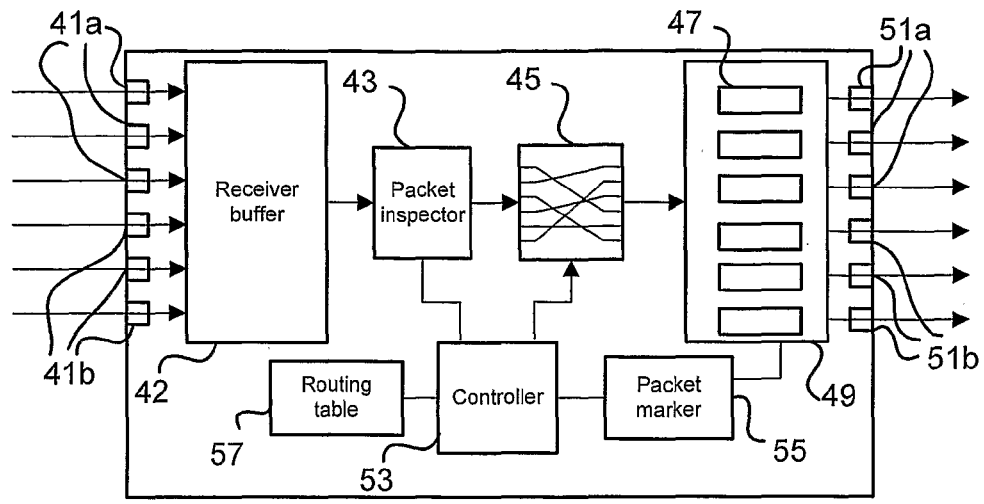
FIG. 5 shows the components of an edge node illustrated in FIG. 1.

Packets eventually reach their intended egress gateway. FIG. 5 shows the internal structure of an edge node which functions as both an ingress and an egress gateway depending on whether packets are arriving from the core network via inputs 41a or from external customers outside of the network via inputs 41b. The function of the components of the edge node differs accordingly and the functions will now be described when the edge node is functioning as an egress gateway.

Incoming packets are received from a core node 3 via input ports 41a. Each input port 41a is connected to a different core node 3 in the network. Since packets may arrive simultaneously, the packets are temporarily stored in a FIFO receiver buffer 42. A packet inspector 43 takes packets from the receiver buffer 42 and examines the headers to determine the external destination address of the packet. A controller 53 receives the extracted destination address and performs a lookup into a routing table 57 to determine the output port 51a to forward the packet to the destination. The controller 53 then controls switch 45 to place the packets into an appropriate queue 47 inside a send buffer 49. The packets are then processed by packet marker 55 to remove any network specific headers before being sent towards their destination via output ports 51a connected to external customers.

Input ports 41b are linked to external customers and output ports 51b are linked to core nodes 3 since the edge node 7 can function both as an ingress gateway and an egress gateway.

In addition to forwarding and delivering packets, the egress gateways are arranged to monitor network traffic from each of its input ports for reporting pre-congestion to the ingress gateway. Unlike the core nodes 3, the edge nodes 7 are aware of the paths defined though the network. The egress gateways can examine incoming flows of packets to determine the path they took through the network and additionally whether they experienced congestion. For each path, the packet inspector 43 continually monitors the rate at which it is receiving NM packets and also RT/TT marked packets. It also periodically performs a process to determine congestion, in this embodiment, every 50 milliseconds.

Figure 6:
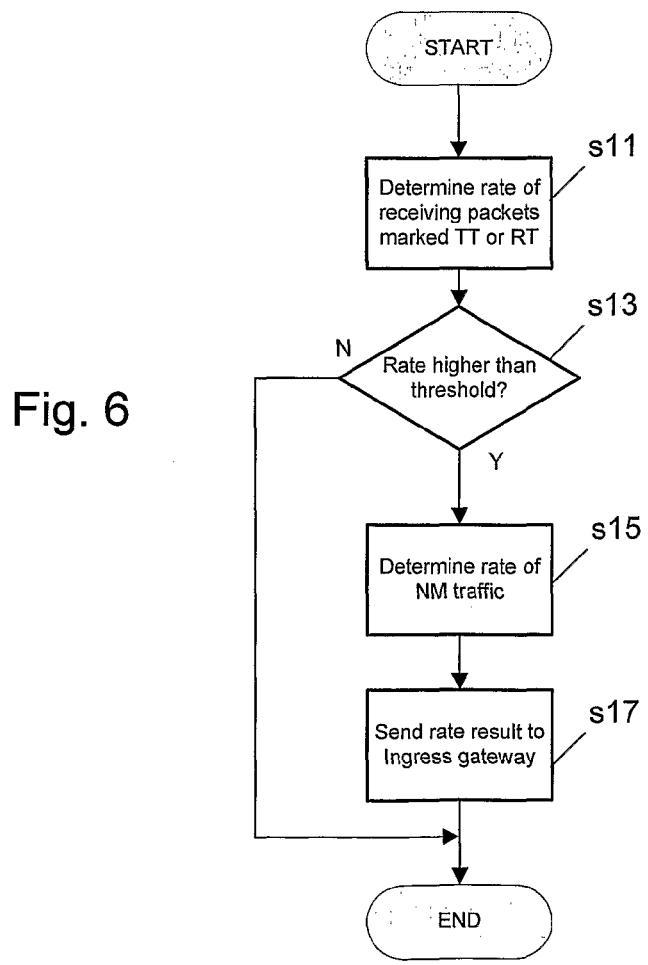
FIG. 6 is a flow chart showing the operation of a packet inspector of an edge node when functioning as an egress gateway.

FIG. 6 is a flowchart showing the periodic processing of the packet inspector on each path. In step s11, the packet inspector 43 determines the current rate at which it is receiving TT or RT marked packets and in step s13 the determined rate is compared against a threshold. In this embodiment, the threshold is two TT or RT marked packets a second. If the current rate is below the threshold, then processing ends and no determination of congestion is made.

If the current rate is higher than the threshold, then the packet inspector 43 can deduce that at least one link on the path between the ingress gateway and egress gateway is overloaded beyond its supportable rate. It is therefore necessary to terminate some of the flows and this must be performed at the ingress gateway.

To provide the ingress gateway with sufficient information to determine how many flows of packets need to be terminated, in step s15 the packet inspector determines the rate of NM packets being received and uses this figure as an estimate of the maximum supportable rate along the path. In step s17 the egress gateway sends the result to the ingress gateway for that path in a control message on one of the core facing output lines 51b.

Ingress Gateways

As mentioned above with reference to FIG. 5, the edge nodes can function simultaneously as egress gateways and ingress gateways depending on whether data is received via input lines 41a connected to the core of the network or 41b connected to external customers.

Ingress gateways receive data on input ports 41b from external customers and are responsible for admission control of new flows of data packets and for introducing the data packets of previously admitted flows into the network for transmission across the network to an egress gateway along a predefined path. Each input port 41b is connected to a different external customer 9 which may itself be another network. Since packets may arrive simultaneously, the packets are temporarily stored in a FIFO receiver buffer 42. A packet inspector 43 takes packets from the receiver buffer 42 and examines the headers to determine the external destination address of the packet. A controller 53 receives the extracted destination address and performs a lookup into a routing table 57 to determine which path the packet should be sent on to reach the destination. The controller 53 then controls a switch 45 to place the packets into an appropriate queue 47 inside a send buffer 49. The packets are then processed by packet marker 55 to add any network specific headers and to mark packets (described in more detail below) before being sent towards their destination via output ports 51a into the core of the network.

The packet marker 55 maintains a list of all the different incoming connections and assigns the respective flow identity to each of them. Normally packet marker 55 does not add any markings to packets within flows, i.e. the packets in all flows are sent as NM packets and the flows are logged as NM flows. However, when the network is congested, the ingress gateway is responsible for flow termination in addition to admission control by denying new flows from being accepted into the PCN network for transportation.

In an ideal situation, the ingress node would terminate exactly the number of flows necessary to resolve the congestion situation. However, in complex network topologies, if all ingress nodes were to terminate flows to match the supportable rate estimate received from the egress gateway of each path, too many flows would be terminated leading to unnecessary loss of service on the network. Examples of loss of service include dropped telephone conversations and aborted video streaming.

Instead of terminating the exact number of flows to meet the fed-back supportable rate estimates received from the egress gateway, the ingress gateway calculates a difference between the received supportable rate estimate and the rate of NM marked traffic being introduced into the network by the ingress gateway. The ingress gateway then only terminates a proportion of the flows. This proportion is predetermined prior to operation and is set at 30% of the calculated difference. Terminating just a proportion of the calculated difference will not resolve the congestion situation so in addition to terminating some flows, another proportion of the flows are marked RT. In this embodiment, 50% of the calculated flow differences are marked as RT.

Figure 7:
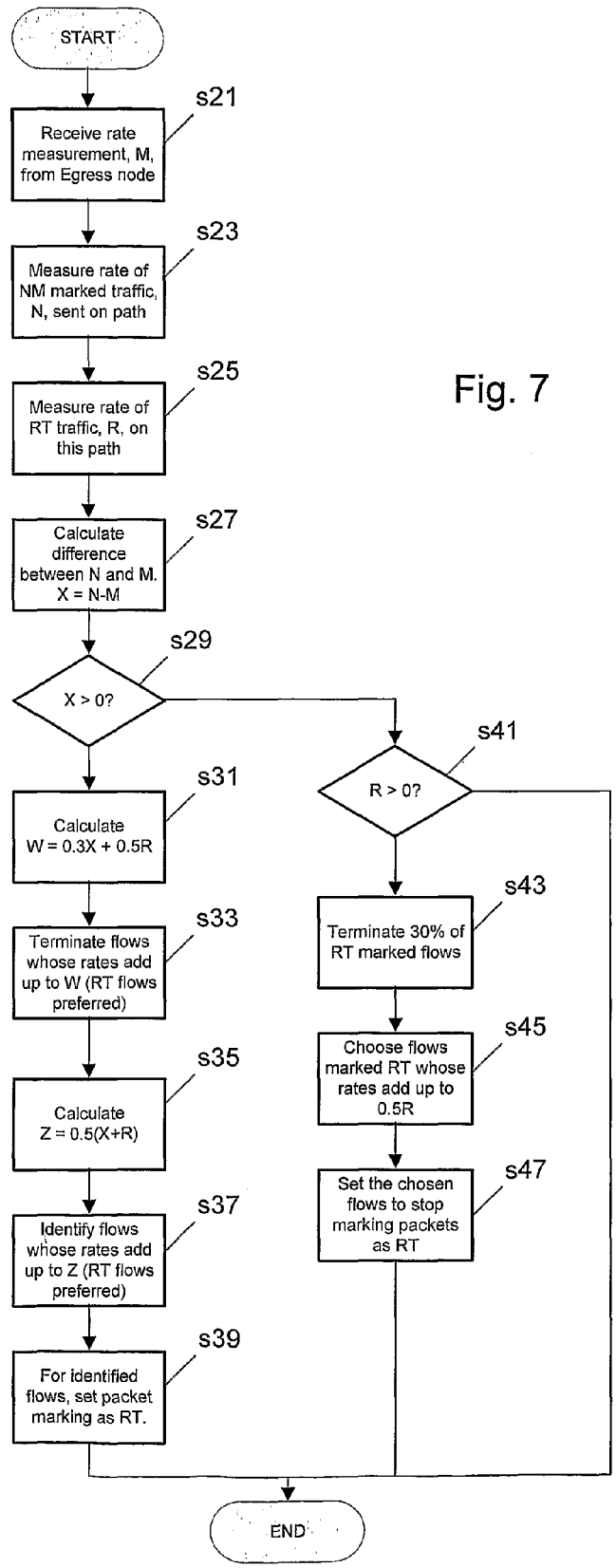
FIG. 7 is a flow chart showing the operation of a packet marker of an edge node when functioning as an ingress gateway.

The processing of the ingress gateway for handling pre-congestion on a path is set out in the flowchart of FIG. 7 and will be described for a path from edge node 7A (ingress gateway) to edge node 7B (egress gateway) carrying 100 flows each having a bandwidth of 1 Mbps. The process is performed every time a control message is received.

Having received a control message from the egress gateway 7B, in step s21, the packet inspector 43 of the ingress gateway 7A extracts supportable NM packet rate estimate from the control message and forwards it via controller 53 to packet marker 55. At packet marker 55 this estimate value is assigned to a variable M. In this example, M is 60 Mbps.

In step s23, the packer marker 55 measures the rate of NM marked traffic, N, sent on the path identified in the control message, in this example N is 100 Mbps. The remaining steps are performed by the packet marker 55.

In step s25, the rate of traffic marked with the RT marking, R, currently being sent on the path is measured. In this example, R is 0 Mbps because until this point in time, no congestion has occurred.

In step s27, a difference value, X, between the rate of NM traffic leaving the node and the rate estimate from the egress gateway is calculated. In this example, X is 40 Mbps.

In step s29, the packet marker calculates whether the difference value is greater than 0. If it is not, then processing proceeds to step s51 which will be described later. In this example, X is 40 and therefore processing proceeds to step s31.

In step s31, the packet marker 55 calculates a correction bandwidth value W according to the formula $W=0.3X+0.5R$. As mentioned earlier, instead of simply terminating flows to meet the received supportable rate measurement M, the ingress gateway is arranged to terminate only a predetermined proportion of the difference (30% in this embodiment) and to mark a second predetermined portion of the difference (50% in this embodiment) as RT so that they do not get included in the calculations performed by the core nodes. In this example, $W=(30\% \text{ of } 40)+(50\% \text{ of } 0)=12$ Mbps.

Next in step s33 flows are terminated so as to meet the calculated bandwidth W. Since there are no RT marked flows and each flow has a bandwidth of 1 Mbps, in this embodiment, twelve flows are terminated. The ingress gateway 7A uses a policy to choose flows for termination and marking as RT. In this embodiment, each flow has an associated priority and the ingress gateway ranks the priorities. The lower priority flows are chosen for termination and marking under RT than those which have a higher priority such as emergency calls.

In step s35, the packet marker 55 calculates how many flows need to be marked as RT. This value Z is 50% of (X+R). In this example, Z is 20 Mbps.

In step s37, flows are identified to be marked as RT. Since each flow is 1 Mbps, then 20 flows are chosen and in step s39, where packets belonging to an RT flow are received, they are marked as RT before transmission into the network. Processing of the control message then ends.

The processing of the packet marker of the ingress gateway 7A in response to the control message from egress gateway 7B has resulted in twelve flows being terminated and twenty flows being marked as RT. The NM rate from the ingress gateway is therefore 68 Mbps. The changes to the path propagate through the network then propagate to the egress gateway and a new supportable rate estimate will be calculated if congestion still exists.

The processing of the ingress gateway 7A in a case where the egress gateway 7B reports that the new supportable rate is 65 Mbps will now be described.

At step s21, the variable M is set at 65 Mbps.

At step s23, the rate of NM marked packets is determined to be 68 Mbps

At step s25, the rate of RT marked packets is 20 Mbps.

At step s27, the difference value X is 3 Mbps.

At step s29, X is greater than 0 so processing proceeds to step s51.

At step s31, W is $(0.3*3+0.5*20)=11$ flows to be terminated.

At step s33, 11 of the RT marked flows are terminated since they take preference to the NM marked flows.

At step s35, Z is $0.5*(3+20)=11$ flows.

At step s37, nine flows are already marked as RT so two additional flows are selected to be marked as RT flows and at step s39, the flows are marked RT.

The processing of the ingress node in response to the second control message has resulted in 11 further flows being terminated and 11 flows being marked as RT. The NM rate from the ingress gateway is therefore 66 Mbps. The changes to the path propagate through the network then propagate to the egress gateway and a new supportable rate estimate will be calculated if congestion still exists.

The processing of the ingress gateway 7A in a case where the egress gateway 7B reports that the new supportable rate is 66 Mbps will now be described.

At step s21, the variable M is set at 66 Mbps.

At step s23, the rate of NM marked packets is determined to be 66 Mbps

At step s25, the rate of RT marked packets is 11 Mbps.

At step s27, the difference value X is 0 Mbps.

At step s29 since X is 0, processing proceeds to step s41 instead of step s31. At step s41, a check is made for any RT marked flows. If there are no RT flows, processing ends because a supportable rate estimate has been reached without any congestion occurring on the path. If there are RT flows, then processing proceeds to step s43.

In step s43, instead of 30% of the difference between the supportable rate and the measured rate, a value equal to 30% of the RT marked flows is calculated. In this example, it is 0.3*11=3 flows that are terminated.

In step s45, half of the currently RT marked flows are selected to be marked as normal NM flows. In this example 0.5*11=6 flows and in step s47, packets belonging to those selected six flows are transmitted from the ingress gateway with the NM marking. The transmission rate of the ingress node is now 72 NM marked flows with 5 RT flows.

As can be shown from the above worked example, marking flows as RT instead of terminating them has a big advantage in recovering throughput once congestion has eased. RT marked flows can be "un-terminated" easily whereas actually terminating a flow cannot be reversed. Using the flexibility to reduce the amount of RT flows allows the ingress node to more quickly reach a safe level but without terminating too many flows.

SECOND EMBODIMENT

In the first embodiment, the packet marking operation of the core nodes was implemented using a token bucket scheme. In the second embodiment, virtual queue marking is used.

Core Nodes

In this second embodiment, the core nodes meter the amount of traffic passing through them having the NM marking using a virtual queue having a token rate set at 90% of the line rate of the output port. As with the first embodiment, this will be referred to as the supportable rate.

NM packets take tokens from the virtual queue in proportion to their packet size. If the queue has enough tokens then the marking of the packet is not changed. If the virtual queue has insufficient tokens then the marking of the packet is changed to TT.

Packets marked TT (by another core node) or RT (by an ingress node) are not monitored by the core nodes. This is similar to the admission control marking defined by the PCN WG but differing in which packets are used for monitoring and which markings are used for marking.

Egress Gateways

As in the first embodiment the egress gateways measure the rate at which TT or RT marked packets are being received on each path and if the rate exceeds a threshold, then a control message is sent to the ingress gateway to inform it of the congestion. In this embodiment, the egress gateways measure the proportion of received packets which are TT and RT packets. This proportion gives a signal which indicates whether the supportable rate is being exceeded by the arriving NM marked traffic and if so, a measure of how far it is being exceeded. The egress gateway sends this signal in a control message to the ingress gateway of the path as in the first embodiment.

Ingress Gateway

As in the first embodiment, the ingress gateway normally sends data packets into the network without markings. However, in response to a control message from the egress gateway, some flows are terminated and others are marked RT. The operation of the ingress gateway in the second embodiment is more aggressive at marking packets as RT before any flows are terminated.

In particular, the ingress gateway responds to the congestion signal by marking flows as RT flows and only terminating a small portion of flows. As the number of RT marked flows increases, then flows are terminated.

The operation of the ingress gateway in the second embodiment will be described with reference to FIG. 2. The ingress gateway 7D is carrying 100 flows each having a bandwidth of 1 Mbps along a path to egress gateway 7C.

If a congestion signal is received indicating 100% congestion, then the packet marker of ingress gateway 7D may start to terminate NM flows at a rate of 1% per second. Simultaneously it will mark NM flows as RT flows at 20% per second and similarly terminate RT flows at a rate of 30% per second.

After 1 second from reception of the control signal, the ingress gateway 7D terminates 1 flow and marks 20 flows as RT. NM packets will now be entering the network at a rate of 79 Mbps.

Now that less traffic is entering the network, core nodes which are shared by paths from ingress gateways to egress gateways will become less congested and similarly mark less packets as TT packets. This will cause some paths to reduce their congestion signal. In this example, the egress gateway 70 reports now reports a very low signal of 5% and sends this in a control message to the ingress gateway 7D.

Upon receiving the low congestion signal, the ingress gateway 7D can deduce that 79% of the NM flows it is sending is below the supportable rate. However it has no indication of how much of the RT marked traffic can be carried. In this example the ingress gateway selects 20% of the RT marked flows to be sent as NM flows while continuing to terminate 30% of the RT marked flows. So in the next second, the ingress gateway terminates 4 flows and un-marks 6 flows. Now, there are 85 NM flows while 10 flows are marked RT.

The ingress gateway continues to react to the congestion signals received from the egress gateway throughout the operation of the network.

As with the previous embodiment, the advantage over a conventional system is that flows are marked RT so that they are not included in congestion calculations but are not actually terminated and hence can be un-terminated. This allows the network to quickly react to network conditions without unnecessarily terminating flows.

In the embodiments, the nodes act asynchronously according to a local schedule. It will be clear to the skilled person that alternative coordination mechanisms can be used ranging from complete synchronicity to partially controlled interleaving.

In the embodiments, the flows are terminated according to a policy specified at each ingress gateway which terminates flows according to their priority. In an alternative, the policy to terminate flows also takes into account other commercial considerations such as contractual arrangements with different customers.

In the embodiment, only ingress gateways are allowed to terminate flows. However, in cases of high congestion it is possible the traffic flow through a core node will exceed the line rate on one or more output ports. Therefore in a modification of the embodiment systems, the core nodes are also enabled to drop packets. In such a case, the packet inspector of the core nodes recognises RT and TT packets and the controller causes the packet marker to drop RT and TT marked packets in preference to NM packets since RT and TT marked flows are likely to be terminated later anyway. This not only reduces congestion in the core of the network but also improves the accuracy of the supportable rate estimate.

The invention claimed is:

1. A method of flow control on a network formed of a plurality of edge nodes and a plurality of core nodes, in which a plurality of flows, each formed of data packets, are introduced into the network from one of the edge nodes functioning as an ingress gateway, and travel on a predefined path via at least one of the core nodes to a different edge node functioning as an egress gateway, the method comprising:
each core node:
comparing a first reception rate of data packets against a first threshold value; and
if the first reception rate is greater than the first threshold value, adding a first congestion marker (TT) to the header of received packets;
the egress gateway:
monitoring the number of received unmarked data packets, packets marked with the first congestion marker and packets marked with a second congestion marker (RT);
sending a network congestion message containing the monitored data as an indicator of network congestion, to the ingress gateway;
the ingress gateway:
receiving the network congestion message from the egress gateway;
terminating a first subset of the flows such that data packets belonging to those flows are not sent to the at least one core node;
selecting a second subset of flows for possible termination;
marking received data packets belonging to the second subset of flows with the second congestion marker (RT); and
sending data packets marked with the second congestion marker (RT) to the egress gateway via the network,
wherein the method further comprises:
the core nodes ignoring any data packets containing the first congestion marker (TT) or the second congestion marker (RT) in the comparison of the first reception rate; and
the ingress gateway unselecting flows from the second subset of flows, if the ingress gateway receives a network congestion message indicating that network congestion has decreased.

2. A method according to claim 1, further comprising:
the egress gateway:
comparing a second reception rate of packets containing either the first congestion marker (TT) or the second congestion marker (RT) against a second threshold value;
if the second reception rate is greater than the second threshold value, determining a third reception rate of unmarked data packets for sending to the ingress gateway;
the ingress gateway:
calculating a difference value between the received third reception rate and a sending rate of unmarked flows being introduced onto the network;
wherein:
the number of terminated flows in the first subset of flows is a first predetermined proportion of the calculated difference; and
the number of selected flows in the second subset of flows is a second predetermined proportion of the calculated difference, and
the sum of terminated flows and marked flows in accordance with the first and second proportion is less than the calculated difference.

3. A method according to claim 1, further comprising:
the egress gateway:
calculating a ratio of the number of received unmarked packets against the number of received data packets carrying the first or second congestion marker (TT, RT) for sending to the ingress gateway; and:
the ingress gateway:
marking flows with the second congestion marker (RT) at a predetermined marking rate; and
terminating flows from said first subset of flows at a predetermined termination rate which is a proportion of the predetermined marking rate.

4. A method according to claim 1, wherein the ingress gateway selects the set of flows for possible termination by:
accessing a flow processing policy and choosing flows in order of flow priority.

5. A network edge node for performing flow control within a network of edge nodes and core nodes for transporting a plurality of flows, each formed of data packets, along a predefined path across the network, the network edge node comprising:
a network interface for communication with at least one core network node and at least one data external network entity;
a data packet receiver for receiving data packets from the at least one core node and from the at least one external network entity;
a data packet processor determining where to send received data packets for onward transmission; and
a data packet transmitter for sending data packets to the at least one core node and to the at least one external network entity,
wherein the edge node has a first mode of operation as a network ingress gateway and a second mode of operation as a network egress gateway;
wherein in the second mode as an egress gateway:
the data packet processor is operable to monitor the number of received data packets, and distinguish between an unmarked data packet, a data packet having a first congestion marker (TT) and a data packet having a second congestion marker (RT); and
generate a network congestion message containing the monitored data as an indicator of network congestion to another edge node in the network operating as an ingress gateway; and
wherein in the first mode as an ingress gateway:
the data packet processor is operable to:
determine whether a network congestion message has been received;

terminate a first subset of flows;
select a second subset of flows for possible termination; and
mark received data packets belonging to the second subset of flows with the second congestion marker (RT);
wherein in the first mode the ingress gateway is operable to unselect flows from the second subset of flows, if a network congestion message indicating that network congestion has decreased is received.

6. An edge node according to claim 5, wherein
in the second mode as an egress node the data packet processor is further operable to:
compare a second reception rate of packets containing either the first congestion marker (TT) or the second congestion marker (RT) against a second threshold value; and
determine a third reception rate of unmarked data packets for sending to the ingress gateway if the second reception rate is greater than the second threshold value; and
wherein in the first mode as an ingress gateway the data packet processor is operable to:
calculate a difference value between the received third reception rate and a sending rate of unmarked flows being introduced onto the network; and
wherein:
the number of terminated flows in the first subset of flows is a first predetermined proportion of the calculated difference; and
the number of selected flows in the second subset of flows is a second predetermined proportion of the calculated difference, and
the sum of terminated flows and marked flows in accordance with the first and second proportion is less than the calculated difference.

7. A network edge node according to claim 5, wherein
in the second mode as an egress gateway the data processor is operable to:
calculate a ratio of the number of received unmarked packets against the number of received data packets carrying the first or second congestion marker (TT, RT) for sending to the ingress gateway; and:
in the first mode as an ingress gateway the data processor is operable to:
mark flows with the second congestion marker (RT) at a predetermined marking rate; and
terminate flows from said first subset of flows at a predetermined termination rate which is a proportion of the predetermined marking rate.

8. A network edge node according to claim 5, wherein in the first mode the data packet processor is operable to choose flows for termination and marking with the second congestion marker in order of flow priority.

9. A data network for transporting flows of data packets, comprising:
a plurality of edge network nodes configured as an ingress gateway;
a plurality of edge network nodes configured as egress gateways; and
a plurality of core nodes for routing flows across the network from the ingress gateways to the egress gateways;
wherein at least one of the edge network nodes configured as an ingress gateway is a network edge node for performing flow control within a network of edge nodes and core nodes for transporting a plurality of flows, each formed of data packets, along a predefined path across the network, the network edge node comprising:
a network interface for communication with at least one core network node and at least one data external network entity;
a data packet receiver for receiving data packets from the at least one core node and from the at least one external network entity;
a data packet processor determining where to send received data packets for onward transmission; and
a data packet transmitter for sending data packets to the at least one core node and to the at least one external network entity,
wherein the network edge node has a mode of operation as a network ingress gateway;
wherein at least one of the egress gateways is configured to monitor the number of received data packets, and distinguish between an unmarked data packet, a data packet having a first congestion marker (TT) and a data packet having a second congestion marker (RT), and generate a network congestion message containing the monitored data as an indicator of network congestion to another edge node in the network operating as an ingress gateway; and
wherein in the mode as an ingress gateway:
the data packet processor is operable to:
determine whether a network congestion message has been received;
terminate a first subset of flows;
select a second subset of flows for possible termination; and
mark received data packets belonging to the second subset of flows with the second congestion marker (RT);
wherein in the mode the ingress gateway is operable to unselect flows from the second subset of flows, if a network congestion message indicating that network congestion has decreased is received.

10. A data network for transporting flows of data packets, comprising:
a plurality of edge network nodes configured as an ingress gateway;
a plurality of edge network nodes configured as egress gateways; and
a plurality of core nodes for routing flows across the network from the ingress gateways to the egress gateways;
wherein at least one of the edge network nodes configured as an egress gateway is a network edge node for performing flow control within a network of edge nodes and core nodes for transporting a plurality of flows, each formed of data packets, along a predefined path across the network, the network edge node comprising:
a network interface for communication with at least one core network node and at least one data external network entity;
a data packet receiver for receiving data packets from the at least one core node and from the at least one external network entity;
a data packet processor determining where to send received data packets for onward transmission; and
a data packet transmitter for sending data packets to the at least one core node and to the at least one external network entity,
wherein the network edge node has a mode of operation as a network egress gateway:
the data packet processor is operable to monitor the number of received data packets, and distinguish between an unmarked data packet, a data packet having a first congestion marker (T) and a data packet having a second congestion marker (RT); and generate a network congestion message containing the monitored data as an indicator of network congestion to another edge node in the network operating as an ingress gateway; and wherein in the ingress gateway is operable to:
determine whether a network congestion message has been received;
terminate a first subset of flows;
select a second subset of flows for possible termination;
mark received data packets belonging to the second subset of flows with the second congestion marker (RT); and
unselect flows from the second subset of flows, if a network congestion message indicating that network congestion has decreased is received.

* * * * *